Aug. 12, 1941.  C. M. KEARNS, JR., ET AL  2,252,464
STRESS MEASURING MEANS
Filed Dec. 6, 1937  2 Sheets-Sheet 1

INVENTOR.
Charles M. Kearns Jr.
Ralph M. Guerke
BY
ATTORNEY

Aug. 12, 1941.  C. M. KEARNS, JR., ET AL  2,252,464
STRESS MEASURING MEANS
Filed Dec. 6, 1937   2 Sheets-Sheet 2 amplifier
oscillograph

INVENTOR.
Charles M. Kearns Jr.
Ralph M Guerke
BY
Harris G. Lucher
ATTORNEY

Patented Aug. 12, 1941

2,252,464

UNITED STATES PATENT OFFICE 2,252,464

STRESS MEASURING MEANS

Charles M. Kearns, Jr., East Hartford, Conn., and Ralph M. Guerke, Sommerville, Mass., assignors to United Aircraft Corporation, East Hartford, Conn., a corporation of Delaware Application December 6, 1937, Serial No. 178,408

8 Claims. (Cl. 177—330)

This invention relates to an improved method and apparatus for measuring strains in bodies subjected to stresses and has particular reference to an improved method and apparatus for measuring strains in bodies subjected to abrupt changes in stress such as bodies subjected to impact loads or vibrations.

An object of the invention resides in the provision of an improved method and apparatus of the character specified by means of which strains or variations in strains in a body may be indicated by variations in an electrical current.

A further object resides in the provision of an improved method and apparatus of the character described, by means of which the magnitude of the strain or the magnitude of the variation in strain in a body subjected to test may be measured by the magnitude of an electrical current or by the magnitude of the changes in an electrical current.

A still further object resides in the provision of an improved method and apparatus of the character indicated which may be utilized to measure the strains or variation in strains in a moving or rotating body.

An additional object resides in the provision of an improved method and apparatus of the character indicated which may be utilized to measure the strain or strain variation in a rapidly rotating body and which will not be rendered inaccurate by the effect of the centrifugal forces acting on the body.

Other objects and advantages will be more particularly pointed out hereinafter or will become apparent as the description proceeds.

In the accompanying drawings in which like reference numerals are used to designate similar parts throughout, there is illustrated, by way of example, a suitable form of apparatus and two slightly different methods of utilizing the apparatus to measure strains or strain variations in bodies, particularly rotating bodies, subjected to varying stresses. The drawings, however, are for the purpose of illustration only and are not to be taken as limiting or restricting the invention.

Figure 1:
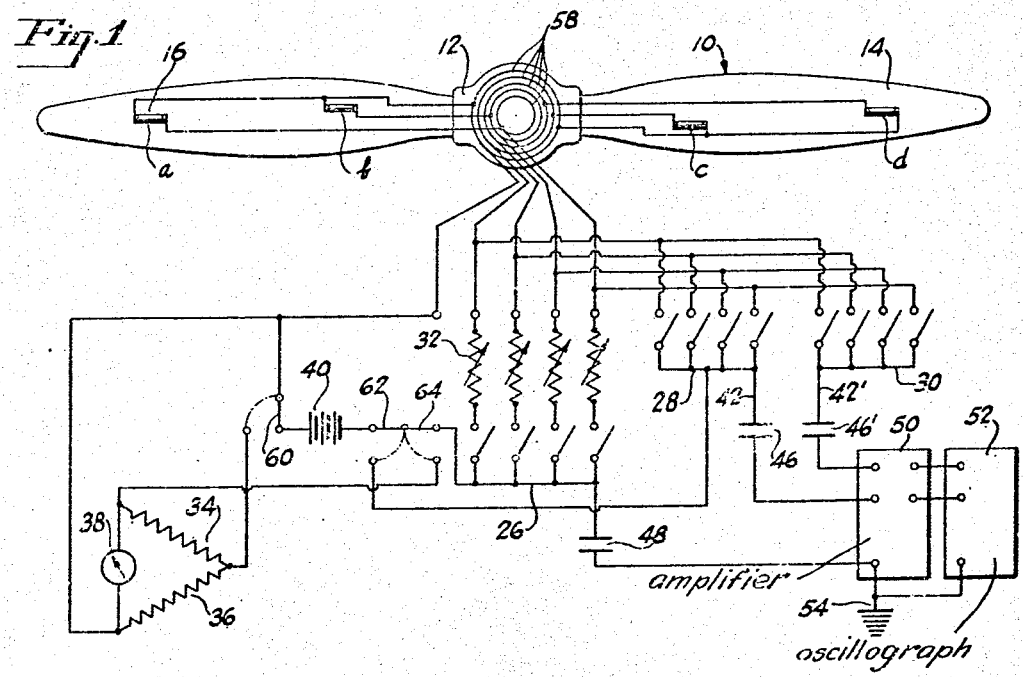
Fig. 1 is a schematic illustration of an apparatus for measuring strains or strain variations in a rotating body such as an aeronautical propeller.

Referring to the drawings in detail and particularly to Fig. 1, the numeral 10 generally indicates an aeronautical propeller which has been shown as an example of a body in which the strain or strain variations are to be measured. It is to be understood, however, that the invention is in no way limited to the measurement of strains in any particular object whether moving or stationary.

In carrying out the improved method certain points on the hub 12 or blades 14 of the propeller are selected at which it is desired to measure the strain or strain variations. In the illustrative examples shown, two points on each blade have been selected as indicated at $a$, $b$, $c$ and $d$. At each of these points a strain sensitive device, hereinafter referred to as an extensometer, is secured to the surface of the blades.

Figure 6:
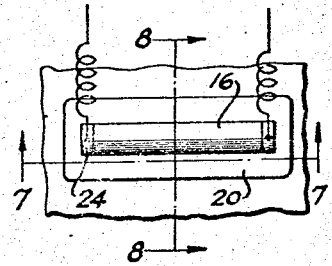
Fig. 6 is a plan view of a resistant element constituting an essential part of the apparatus and shows the resistant element in position on a body the strain or strain variations in which are to be measured.
Figure 8:
Fig. 8 is a sectional view on the line 8—8 of Fig. 6.
Figure 7:
Fig. 7 is a partly sectional view taken on the line 7—7 of Fig. 6.

The extensometer and the manner of attaching it to the surface of the body in which the strain or strain variation is to be measured is particularly illustrated in Figs. 6, 7, and 8. The extensometer 16 is a relatively flat, elongated strip of a material including carbon particles, distributed among particles of a material such as silica in a proportion of approximately one to seven and held together by a suitable binder having an appreciable degree of resiliency such as a resinous or plastic cement or phenolic condensation product. The extensometer 16 may be of any suitable dimensions but one that has been successfully used has a length of approximately 1¾ in., a width of approximately ⅜ of an in. and a thickness of approximately 1/16 of an inch. The shape of the extensometer may be also to a considerable degree a matter of choice but the particular extensometer illustrated in Figs. 6, 7 and 8 has one flat surface joined to a cylindrical surface and may be formed by grinding flat a cylindrical prism of suitable material. In applying the extensometer to the surface, the surface is first thoroughly cleaned and then coated with a suitable cement as indicated at 18 in Figs. 7 and 8. A thin strip of paper 20 is then applied to the coated surface and the extensometer 16 is cemented to the outer surface of the paper as indicated at 22. In Figs. 7 and 8 the cement and paper layers have been shown as having an exaggerated thickness for the purpose of clearness and simplicity in the illustration. While various kinds of cement might be used for attaching the extensometer for the surface to be tested, the cement used should have the quality of being applicable in extremely thin layers and should be sufficiently hard so that the length of the extensometer will be forced to follow substantially exactly the changes in length in the surface to which it is attached. A commercial cement known to the trade as "Dekotinsky" cement has been found satisfactory for this purpose. A conductive metal, such as copper, tin, silver or the like is applied by some suitable means such as spraying or enamelling, to the extreme end portion of the extensometer, as indicated at 24 in Fig. 6, and electric conduits in the form of relatively fine wires are secured at their ends to the coated end portions of the extensometer by suitable means such as solder.

Preferably two different kinds of circuits are provided in connection with the extensometer and means, such as the switches schematically indicated at 26, 28 and 30, for connecting any one of the extensometers into either of the circuits as may be desired. One of the circuits is an extensometer testing or resistance measuring circuit, schematically illustrated in elementary form in Fig. 3, and the other is a strain measuring circuit, schematically illustrated in elementary form in Fig. 4. In the testing circuit the extensometer 16 is connected into a Wheatstone bridge circuit in series with a variable resistance 32 of known characteristics and in parallel with two fixed resistances 34 and 36 of an order such that the galvanometer 38 will be balanced when the variable resistance 32 has exactly the same resistance as the extensometer 16. The bridge is connected in the usual manner to the terminal of a battery 40 which supplies the necessary current for measuring the resistance of the extensometer.

Figure 4:
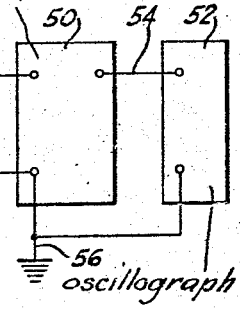
Fig. 4 is a schematic illustration of an elementary strain measuring circuit.

The strain measuring circuit schematically illustrated in Fig. 4 includes an exciter circuit in which the current passes from one terminal of the battery 40 through the extensometer 16 and through the variable resistance 32 in series and back to the battery, and an indicating circuit energized by current variations in the exciter circuit. When measuring the strain the variable resistance 32 is preferably always so adjusted that its resistance is exactly the same as the resistance of the extensometer, although a variable or fixed resistance not entirely in balance with the extensometer may be used to give approximate results which may be sufficiently accurate for the particular purpose or may be reduced to a sufficient accuracy by computation. The exciter circuit is coupled by means of leads 42 and 44 through the respective condensers 46 and 48 to the indicating circuit including the amplifier 50, the oscillograph, or other current analyzer 52, and the ground connection 54. In this circuit any variation in the resistance of the extensometer 16 with respect to the resistance of the respective resistor 32 will cause a proportional fluctuation in the current passing through the battery circuit described above. These current fluctuations will induce fluctuations of increased magnitude at the outlet 56 of the amplifier 50 which amplified current fluctuation may be recorded by the oscillograph 52 or indicated by a suitable current analyzer. The exciter circuit may be coupled to the indicating circuit either capacitively, as indicated above, or inductively by means of a suitable transformer if desired.

Figure 3:
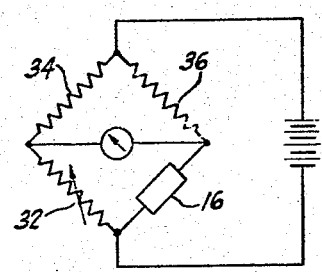
Fig. 3 is a schematic illustration of an elementary testing or resistance measuring circuit for determining the electrical conductivity characteristics of certain elements of the apparatus.

The circuits illustrated in Fig. 1 include an extensometer testing circuit as shown in Fig. 3 and a strain measuring circuit as illustrated in Fig. 4. These two circuits are connected with the extensometers carried at a, b, c, and d upon the blades of the rotating propeller through a set of suitable collector rings 58. The circuit includes a respective variable resistor 32 for each extensometer and suitable switches 60, 62 and 64 for alternatively connecting the extensometers with either the testing circuit or the strain measuring circuit. The switches 26 and 28 are operative to select any particular one of the various extensometers for connection into either of the circuits mentioned. As shown in Fig. 1 the amplifier 50 has been illustrated as a two-channel amplifier so that the indicated strain variation of two separate extensometers may be reproduced at the same time. This construction calls for an additional lead 42' and condenser 46' connectable to the extensometers through the switch 30. The amplifier is connected to a double element oscillograph 52 by means of the outlet lead 56 and the additional outlet lead 56'. Obviously two current analyzers may be substituted for the double element oscillograph if desired. It will be understood that each of the switches schematically illustrated at 26, 28 and 30 is either a plurality of independently operable switches or a multi-pole rotatable switch so that only one connection need be made at a time.

Figure 2:
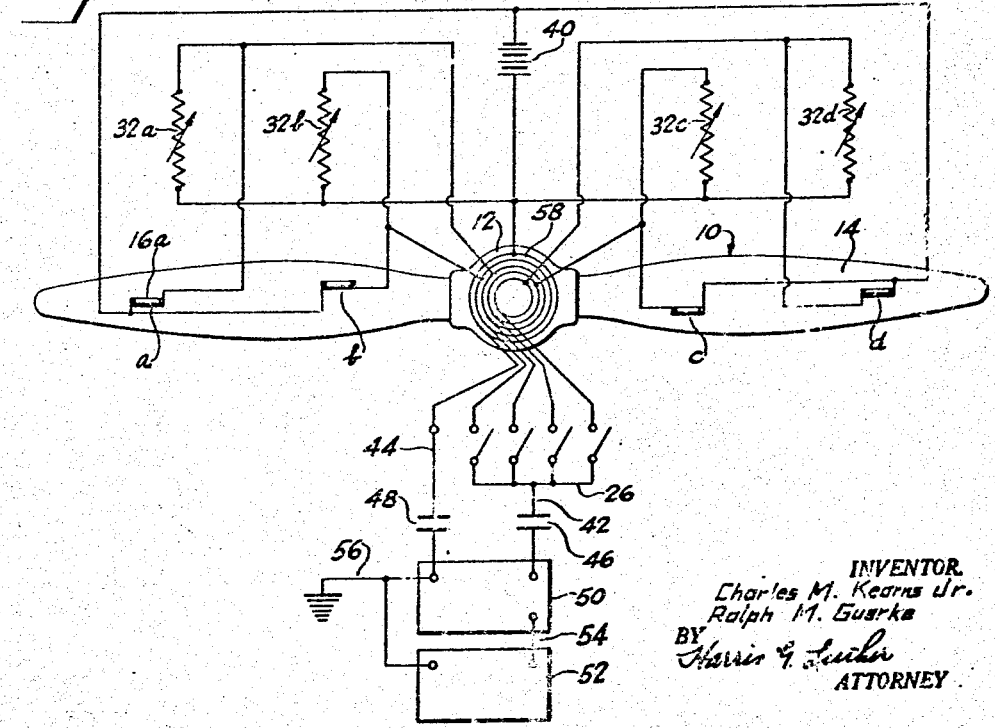
Fig. 2 is a schematic illustration showing a somewhat different arrangement of the apparatus illustrated in Fig. 1.

The modified arrangement illustrated in Fig. 2 may include the same two circuits as illustrated in Figs. 3 and 4 although the testing circuit has been omitted for the sake of simplicity in the illustration. In this arrangement the entire exciter circuit, including the battery, the extensometers and the variable resistors, are carried by the propeller and on the same side of the slip rings 58. The indicating circuit only is carried through the slip rings and the selector switch 26 to the amplifier, thereby eliminating from the stress readings obtained substantially all of the possible error incident to variations in the conductivity of the slip rings and associated brushes.

Figure 9:
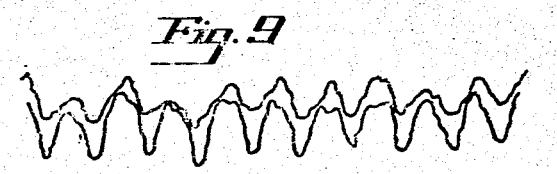
Fig. 9 is an approximate reproduction of an oscillogram produced by the improved method and apparatus.

Fig. 9 shows an approximate reproduction of a record obtained from an oscillograph when measuring vibrational strains in a rotating propeller by the improved method hereinabove set forth. The amplitude of the wave form of the curves shown in Fig. 9 give a comparative indication of the magnitude of the strains at the points at which the measurements were taken. This comparative indication can readily be reduced to a quantitative measurement of strain if the characteristics of the extensometers are definitely known. The invention includes a method and apparatus for definitely determining in quantitative values the proportionate strain-resistance characteristics of the extensometers.

In order to calibrate the extensometers for quantitative results one or more extensometers to be calibrated are secured upon a test beam, indicated at 58 in Fig. 5, in the manner illustrated in Figs. 6, 7 and 8 and described in connection therewith. The beam 58 is securely clamped at one end as indicated at 60 and, for test purposes is loaded at the opposite end as indicated at 62. Preferably, the beam 58 is of the same material as the bodies to be tested so that additional computations to correct for differences in the modulus of elasticity of the two bodies will not be necessary. The opposite ends of the extensometer 16 are connected into a Wheatstone bridge circuit including two fixed resistances 64 and 66 and a valuable resistor of known characteristics 68 so that the resistance of the extensometer at any deflection of the beam 58 can be accurately determined in terms of ohms resistance. At the same time the strain in the beam 58 is measured by some suitable form of direct reading strain gauge such as the Huggenberger strain gauge indicated at 70. By this method a definite determination of the resistance in ohms of the extensometer incident to the strain in the beam upon which it is mounted can be accurately determined. With the increment of increased resistance incident to a unit increased in strain definitely known for each extensometer, the current fluctuation caused by the variations in resistance of the extensometers mounted upon a body being tested can be easily converted into units of strain in the test body.

Figure 5:
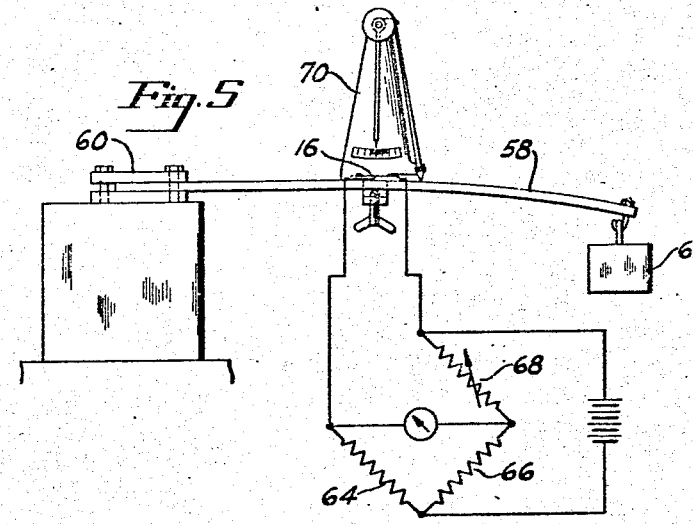
Fig. 5 is a schematic illustration of an apparatus for calibrating certain elements of the strain measuring apparatus.

If a number of extensometers are calibrated at the same time by the apparatus illustrated in Fig. 5, a suitable switch will be provided between corresponding ends of the extensometers and the point of attachment of those ends into the Wheatstone bridge circuit so that the extensometers may be selectively connected into the circuit.

With the extensometers of determined characteristics the method illustrated in Fig. 5 may also be utilized to measure constant or continuing strain in stressed bodies, omitting, of course, the direct reading strain gauge 70. In utilizing this method and apparatus the extensometer will be secured in the manner described above in connection with Figs. 6, 7 and 8 to the body when in an unstressed condition. The body may then be loaded in any desired manner and the incident strain measured in terms of variations in the resistance of the extensometer and converted into units of strain through the quantitative data obtained by calibrating the extensometers.

While one manner of applying the improved method and suitable practical apparatus for applying the method in the manner indicated have been schematically illustrated in the accompanying drawings and described in detail in connection therewith, it is to be understood that the invention is in no way limited to the particular manner of application nor to the particular apparatus so illustrated and described but that such changes in the manner of applying the method and in the apparatus used for that purpose may be resorted to as come within the scope of the subjoined claims.

Having now described the invention so that others skilled in the art may clearly understand the same what it is desired to secure by Letters Patent is as follows:

1. A resistance element for an electrical strain gauge comprising, a thin elongated element of a substantially uniform mixture of finely divided carbon and silica and a resilient binder having an elasticity similar to that of phenolic resin.

2. A resistance element for an electrical strain gauge comprising, a thin elongated element of a substantially uniform mixture of finely divided carbon and silica and a resilient binder having an elasticity similar to that of phenolic resin, said element having at least one side thereof shaped to conform substantially to the surface of a test body.

3. A resistance element for an electrical strain gauge comprising, a thin elongated element of a substantially uniform mixture of finely divided carbon and silica and a resilient binder having an elasticity similar to that of phenolic resin, one side of said element being flattened for attachment of said element to a test body.

4. A resistance element for an electrical strain gauge and a mounting therefor comprising, a thin elongated element of a substantially uniform mixture of finely divided carbon and silica and a resilient binder, said element having at least one side shaped to conform approximately to the surface of a test body, a strip of thin fibrous material cemented to the surface of said test body, and a layer of resilient cement between and connecting said fibrous material and said surface of said element.

5. A strain sensitive electrical resistance element for use in electrical strain indicating apparatus comprising: a thin elongated strip of a composition including carbon particles and particles of an inert material intermingled and held together by a suitable binder with an elasticity having a value similar to that of phenolic resin.

6. A strain sensitive electrical resistance element for use in an electrical apparatus for measuring strains comprising, a thin elongated strip of small dimensions and light weight of a composition including intermingled carbon and silica particles in a ratio of approximately one to seven, in a binder having a degree of resiliency similar to that of phenolic resin.

7. An electrical resistance element for a strain indicator and a mounting therefor comprising a relatively thin elongated strip of a material including carbon particles and inert material in a ratio of approximately one to seven, and a resilient binder, and means cementing the elongated strip in electrically insulated relation to the surface of a body to be stressed.

8. A strain sensitive resistance element for an electrical strain gauge or vibration analyzer comprising, a relatively thin elongated strip of material including carbon particles distributed in a mass of silica particles in a ratio of approximately one to seven and held in position by a resilient binder, said strip being provided with metal coated end portions for the attachment of lead wires thereto.

CHARLES M. KEARNS, Jr.
RALPH M. GUERKE.